United States Patent

Dill

[11] Patent Number: 5,985,449
[45] Date of Patent: Nov. 16, 1999

[54] CRIMPED THERMOPLASTIC FIBERS FOR REINFORCING CONCRETE

[75] Inventor: Robert R. Dill, Burlington, Vt.

[73] Assignee: Specialty Filaments, Andover, Md.

[21] Appl. No.: 08/946,815

[22] Filed: Oct. 8, 1997

[51] Int. Cl.⁶ .................................................. D02G 3/00
[52] U.S. Cl. .................... 428/399; 428/359; 428/369; 428/364; 428/378; 428/373; 428/394; 428/375
[58] Field of Search .................................... 428/394, 375, 428/364, 369, 399, 362, 378, 359, 373; 29/897.34

[56] References Cited

U.S. PATENT DOCUMENTS

| | | |
|---|---|---|
| 4,221,838 | 9/1980 | Hughes et al. . |
| 4,293,614 | 10/1981 | Plischke et al. . |
| 4,585,487 | 4/1986 | Destree et al. . |
| 4,820,585 | 4/1989 | Tedesco et al. ........................ 428/360 |
| 4,916,012 | 4/1990 | Sawanobori et al. . |
| 5,362,562 | 11/1994 | Evans et al. . |
| 5,385,978 | 1/1995 | Evans et al. . |
| 5,807,458 | 9/1998 | Sanders et al. . |

Primary Examiner—William Krynski
Assistant Examiner—J. M. Gray
Attorney, Agent, or Firm—Caesar, Rivise, Bernstein, Cohen & Pokotilow, Ltd.

[57] ABSTRACT

A crimped thermoplastic fiber for use in reinforcing concrete has a length in the range of ¼ inch to 4 inches; an outer diameter in the range of 4 mils to 30 mils; a crimp frequency of 10–30 crimps per inch and an amplitude in the range of ½ mil–10 mils. The invention also includes a cylindrical bundle of the aforementioned fibers retained within an outer paper wrapper that dissolves and/or disintegrates within a concrete mixer in which the wrapped bundles are dispersed.

5 Claims, 1 Drawing Sheet

CRIMPED THERMOPLASTIC FIBERS FOR REINFORCING CONCRETE

BACKGROUND OF THE INVENTION

This invention relates generally to the field of reinforcing concrete and more specifically to the field of using thermoplastic fibers to provide the reinforcing function.

"Reinforcing" or "reinforce" as used in connection with the products of this invention refers to the function of inhibiting the formation of large cracks that, in turn, accelerate the deterioration of the concrete structure; not to the function of actually carrying the structural loads in the concrete as when a large amount of steel reinforcing bar is used.

BACKGROUND ART

It is known to employ thermoplastic fibers; most preferably in the length range of 1 to 2 inches, as a large crack inhibiting (reinforcing) element in concrete structures. However, a problem has existed in establishing a uniform distribution of the filaments throughout the concrete mix in order to avoid low fiber content spots in the cured concrete. Specifically, this problem occurs because the large volume of fibers introduced into the concrete mixer tend to agglomerate into balls, rather than distributing uniformly throughout the mix.

In an effort to alleviate the aforementioned problem, The 3M company developed a system for enhancing the uniformity of distribution of thermoplastic fiber within the concrete mix. Specifically, 3M invented a system wherein individual bundles of fibers, including on the order of 15,000 fibers per bundle, are extruded and then secured in an outer spiral wrapping of crepe paper. The individual bundles initially are formed in large lengths; on the order of 13 feet, and after wrapping in crepe paper are severed into discrete bundle lengths to be mixed with the concrete.

It was discovered that the individual wrapped bundles maintained their integrity for a sufficient period of time to permit them to distribute throughout the mix. Eventually the paper outer wrapping disintegrated due to exposure to water and the mixing action within the concrete mixer, thereby releasing the individual fibers within the discrete bundles. However, the number of fibers within each bundle is sufficiently small to preclude them from mingling together into discrete balls. Rather, the individual fibers within each bundle tend to migrate within the concrete to provide a uniform distribution of reinforcing thermoplastic fibers.

Although it has been recognized in the reinforcing art that crimped metal wires provide enhanced reinforcing properties relative to uncrimped wires, until the present invention it was thought that it would not be possible to achieve a uniform distribution of crimped thermoplastic fibers within the concrete mix to establish the desired reinforcing properties. Specifically, in employing the bundle approach invented by 3M, which is the approach considered by applicant to be the most desirable for establishing uniform distribution of thermoplastic fibers throughout the concrete mix, it was thought that the crimped fibers in the bundles would tend to settle into meshing relationship with each other within the bundles, thereby reducing the overall diameter of the mass of fibers within the bundles. This reduction in diameter of the fiber bundles would cause the fibers within the bundles to fall out of their spiral wrapping before the individual bundles are able to sufficiently separate from each other within the concrete mix to prevent the mass agglomeration, or balling, of the individual fibers within the mix. This problem is particularly acute in the short length bundles formed for inclusion in the concrete mix.

U.S. Pat. No. 4,585,487, issued to Destree et al., discloses reinforcing fiber made of corrugated steel wire having specified critical values of diameter, wave amplitude, wave length, fiber length and ultimate tensile strength. The Destree et al. '487 does not disclose the use of any thermoplastic fibers for reinforcing concrete, let alone crimped thermoplastic fibers in the form of discrete, wrapped bundles as in the present invention.

The present invention achieves the benefits of using crimped thermoplastic fibers in a uniform distribution within a concrete mix to achieve improved reinforcement of the concrete.

SUMMARY OF THE INVENTION

The above and other objects of this invention are achieved with crimped thermoplastic fibers for use in reinforcing concrete, said thermoplastic fibers having a length in the range of ¼ inch to 4 inches; an outer diameter in the range of 4 mils to 30 mils; a crimp frequency of 10 to 30 crimps per inch and an amplitude in the range of ½ mil to 10 mils.

In a preferred form of the invention the crimped fibers have a length in the range of 1 to 2 inches and a diameter in the range of 15 mils to 25 mils. Most preferably the fibers of this invention have a crimp frequency of approximately 20 crimps per inch and an amplitude of approximately 2 mils.

In a preferred form of the invention a fiber bundle for use in reinforcing concrete includes a plurality of discrete fibers having central axes generally aligned with each other in the same direction, an outer paper wrapper tightly confining the outer periphery of the fibers, and wherein the fibers have a length in the range of ¼ inch to 4 inches; a diameter in the range of 4 mils to 30 mils; a crimp frequency of 10 to 30 crimps per inch and an amplitude in the range of ½ mil to 10 mils. Preferably, the wrapped bundle is in the form of a cylinder having a diameter on the order of 1.5–3.5 inches, more preferably about 2 inches.

Most preferably the fibers within the bundle each have a length of 1 to 2 inches and a diameter in the range of 15 mils to 25 mils; with a crimp frequency of about 20 crimps per inch and an amplitude of approximately 2 mils.

In the most preferred form of the invention the outer wrapping of the fiber bundle is formed of crepe paper that is spirally wound about the outer periphery of the bundle of fibers without covering the distal ends of said fibers.

BRIEF DESCRIPTION OF THE DRAWINGS

The above and other objects and many attendant features of this invention will become readily appreciated as the same becomes better understood by reference to the following detailed description when considered in connection with the accompanying drawings wherein.

DESCRIPTION OF THE PREFERRED EMBODIMENTS OF THE INVENTION

Figure 1:
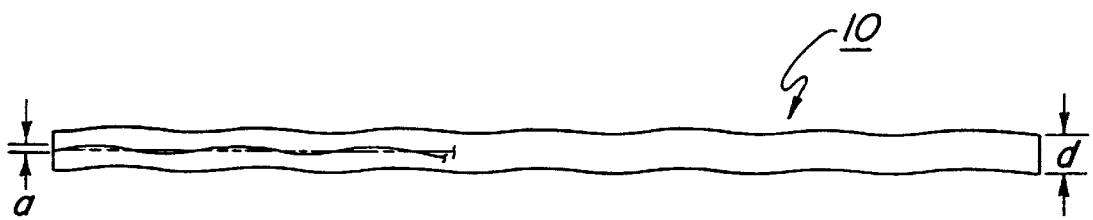
FIG. 1 is an enlarged side elevational view of a thermoplastic fiber in accordance with this invention.

Referring now in greater detail to the various figures of the drawings wherein like reference characters refer to like parts, a fiber in accordance with the present invention is shown generally at 10 in FIG. 1. The individual fibers 10 in accordance with this invention are formed from a suitable thermoplastic polymer, such as a polypropylene homopolymer, and have a diameter d in the range of 4 mils to 30 mils and most preferably in the range of 15 mils to 25 mils. Most preferably the individual fibers 10 have 10 to 30 crimps per inch (i.e., a crimp frequency of 10–30); with the amplitude a of the longitudinal axis of the fiber being in the range of approximately ½ mil to 10 mils. Most preferably the filaments of this invention have approximately 20 crimps per inch, an amplitude of 2 mils and a diameter of approximately 15 mils.

Figure 2:
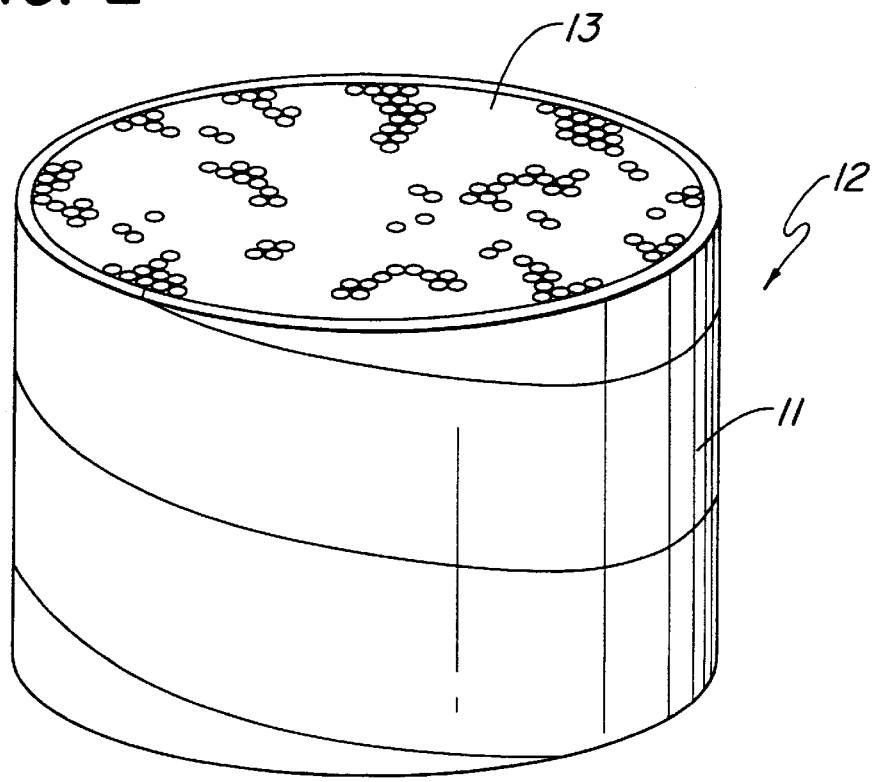
FIG. 2 is an enlarged isometric view of a wrapped fiber bundle in accordance with this invention.

The fibers of this invention are formed by extruding a plurality of filaments from an extruder and then corrugating the filaments in a conventional manner to provide the aforementioned crimp frequency and amplitude. After the individual, extruded filaments have been crimped they are wrapped in a spirally wound, crepe paper outer wrapping 11, and the wrapped bundles are then cut to the desired bundle lengths for use in reinforcing concrete. For example, the individual filaments can be extruded in lengths of up to approximately 13 feet, thereafter, bundled into a cylinder 13, wrapped in a crepe paper outer wrapping 11, and then cut to lengths in the range of ¼ inch to 4 inches to form cylindrical bundles 12 for use in reinforcing concrete (See FIG. 2). Most preferably the wrapped filaments are cut into cylindrical bundles 12 having a diameter in the range of approximately 1.5–3.5 inches and a length in the range of 1 inch to 2 inches. More preferably the diameter of the bundle is approximately 2 inches.

It should be understood that generally the length of the individual bundles varies directly with the diameter of the individual fibers in the bundles. For example, in a preferred form of the invention individual fibers within a bundle have an outer diameter of approximately 15 mils and are approximately 1 inch in length. When the outer diameter of the fibers is increased to 25 mils the length of the fibers within the bundles is generally increased to approximately 2 inches.

The number of fibers employed in each bundle 13 can vary; the only requirement being that there are not so many fibers present in a bundle as to cause them to agglomerate into balls when the outer wrapping separates from them. In accordance with a preferred form of the invention about 15,000 fibers are included in each bundle.

Applicant surprisingly has discovered that the individual fibers 10 within the fiber bundle 13 can be crimped and still be maintained tightly within the outer paper wrapping 11 of the bundle 12 until the wrapping 11 dissolves or disintegrates, if the crimp amplitude is controlled within certain critical ranges.

As stated earlier, most preferably the individual fibers 10 of this invention have 10 to 30 crimps per inch (i.e., a crimp frequency of 10–30); with the amplitude a of the longitudinal axis being in the range of approximately ½ mil to 10 mils. More preferably the fibers of this invention have approximately 20 crimps per inch, an amplitude of 2 mils and a diameter d of approximately 15 mils.

Applicant has discovered that when the amplitudes a is controlled within the above stated ranges the individual fibers within the bundles do not tend to nest within each other in a manner to cause the bundles of fibers within the outer paper wrapping to reduce in diameter and fall out of the outer wrapping prematurely. However, the crimping of the fibers does significantly enhance how well the fiber is gripped by the concrete.

Without further elaboration, the foregoing will so fully illustrate my invention that others may, by applying current or future knowledge, adopt the same for use under various conditions of service.

What I claim is:

1. A fiber bundle for use in reinforcing concrete said bundle including a plurality of discrete thermoplastic fibers having central axes generally aligned with each other in the same direction, an outer paper wrapper tightly confining the outer periphery of the fibers; said fibers having a length in the range of ¼ inch to 4 inches; a diameter in the range of 4 mils to 30 mils; a crimp frequency of 10 to 30 crimps per inch and an amplitude in the range of ½ mil to 10 mils.

2. The fiber bundle of claim 1 wherein each of the fibers within the bundle has a length of 1 to 2 inches and a diameter in the range of 15 mils to 25 mils.

3. The fiber bundle of claim 1 wherein each of the fibers has a crimp frequency of about 20 per inch and an amplitude of approximately 2 mils.

4. The fiber bundle of claim 1 wherein the outer wrapping is a crepe paper wrapping spirally wound about the outer periphery of the fibers without covering distal ends of said fibers.

5. The fiber bundle of claim 1 wherein said bundle is cylindrical having a diameter in the range of 1.5–3.5 inches and a length of 1–2 inches.

* * * * *